(12) United States Patent
Seo et al.

(10) Patent No.: US 7,807,958 B2
(45) Date of Patent: Oct. 5, 2010

(54) SWITCH FOR AN ILLUMINATION DEVICE, AND PROJECTION SYSTEM INCLUDING THE SAME

(75) Inventors: Eun Seong Seo, Seoul (KR); Ji Hyouk Chung, Seoul (KR)

(73) Assignee: LG Electronics Inc., Seoul (KR)

( * ) Notice: Subject to any disclaimer, the term of this patent is extended or adjusted under 35 U.S.C. 154(b) by 570 days.

(21) Appl. No.: 11/828,257

(22) Filed: Jul. 25, 2007

(65) Prior Publication Data

US 2008/0024740 A1     Jan. 31, 2008

(30) Foreign Application Priority Data

Jul. 26, 2006     (KR) .................... 10-2006-0070200

(51) Int. Cl.
    *H01J 3/14*     (2006.01)
(52) U.S. Cl. .................... 250/216; 250/227.21
(58) Field of Classification Search ............. 250/216, 250/239, 227.22, 227.24, 227.21; 362/268–270, 362/298–302; 353/73–77, 85–87, 97–102; 359/831–834, 633–642, 38–49
    See application file for complete search history.

(56) References Cited

U.S. PATENT DOCUMENTS

| | | | |
|---|---|---|---|
| 3,676,667 A | | 7/1972 | Malifaud |
| 5,777,804 A | * | 7/1998 | Nakamura et al. .......... 359/727 |
| 7,213,944 B2 | * | 5/2007 | Shimaoka et al. ........... 362/299 |
| 7,651,227 B2 | * | 1/2010 | Penn et al. .................. 353/102 |
| 2004/0207823 A1 | | 10/2004 | Alasaarela et al. |
| 2005/0018147 A1 | | 1/2005 | Lee et al. |
| 2006/0061870 A1 | | 3/2006 | Wang |
| 2006/0104065 A1 | | 5/2006 | Lee et al. |

FOREIGN PATENT DOCUMENTS

| | | |
|---|---|---|
| EP | 1471746 A2 | 10/2004 |
| KR | 2005-0025538 A | 3/2005 |
| WO | WO-2005/034524 A1 | 4/2005 |

* cited by examiner

*Primary Examiner*—Que T Le
(74) *Attorney, Agent, or Firm*—Birch, Stewart, Kolach & Birch, LLP

(57) ABSTRACT

An illumination device and a projection system including the same are disclosed. The illumination device can implement a small-sized and high-efficiency projection system, and the projection system includes the illumination device. The projection system generates a light signal in which a luminous flux is maximally distributed, and displays a desired image using the generated light signal.

14 Claims, 11 Drawing Sheets

(b)

(b)

(c)

(c)

SWITCH FOR AN ILLUMINATION DEVICE, AND PROJECTION SYSTEM INCLUDING THE SAME

This application claims the benefit of Korean Patent Application No. 10-2006-0070200, filed on Jul. 26, 2006, which is hereby incorporated by reference as if fully set forth herein.

BACKGROUND OF THE INVENTION

1. Field of the Invention

The present invention relates to an illumination device, and more particularly to an illumination device capable of implementing a small-sized and high-efficiency projection system, and the projection system including the illumination device.

2. Discussion of the Related Art

Typically, an optical system for use in a projection engine can be mainly classified into an illumination system and a projection system.

The illumination system enables a light signal generated from a lamp to pass through an integrator or FEL (Fly Eye Lens), such that it uniformly applies the resultant light signal to a small-sized imager.

The projection system enables the light signal generated from the illumination system to be incident upon individual panels, magnifies the imager, and forms an image on a screen.

In this case, the most important performance of the above-mentioned projection engine is how the light signal generated from the light source is effectively focused on the imager.

In the meantime, in order to increase efficiency of a light signal of an illumination unit contained in the above-mentioned illumination system, a specific output angle, at which a luminous flux is maximally distributed, from among several output angles of the light signal generated from the light source should be used as a reference angle, such that the resultant light signal can be effectively applied to illumination lenses.

However, the above-mentioned illumination lenses have a rotational-symmetry structure and a fixed Etendue prescribed when the illumination device is designed, such that the light source is unable to use a desirable light signal in which a luminous flux is maximally distributed.

In order to employ the above-mentioned desirable light signal in which the luminous flux is maximally distributed, there are needed a plurality of illumination lenses, each of which has a large aperture, such that it is difficult to make a small-sized illumination device, resulting in deterioration of light efficiency.

SUMMARY OF THE INVENTION

Accordingly, the present invention is directed to an illumination device and a projection system including the same that substantially obviate one or more problems due to limitations and disadvantages of the related art.

An object of the present invention is to provide an illumination device for employing a light signal in which a luminous flux is maximally distributed, and a projection system including the illumination device.

Another object of the present invention is to provide a small-sized illumination device with high efficiency, and a projection system including the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an illumination device comprises: a light source for generating a light signal; a switch for reconstructing a usage angle of the light signal generated from the light source, and generating the reconstructed light signal; and an illumination lens unit for focusing the light signal generated from the switch.

In another aspect of the present invention, there is provided an illumination device comprising: a light source for generating a light signal; a switch for reconstructing a reference angle of an optic axis of the light signal generated from the light source, and generating the reconstructed light signal; and an illumination lens unit for receiving the light signal having the reconstructed optic-axis reference angle from the switch, and focusing the received light signal.

In yet another aspect of the present invention, there is provided a projection display system comprising: an illumination unit for generating a light signal, reconstructing a usage angle of the light signal, and generating the reconstructed light signal; and a projection unit for synthesizing the light signal generated from the illumination unit, magnifying the synthesized light signal, and imaging the magnified light signal.

In yet another aspect of the present invention, there is provided a projection display system comprising: an illumination unit for generating a light signal, reconstructing a reference angle of an optic axis of the light signal, and generating the reconstructed light signal; and a projection unit for synthesizing the light signal generated from the illumination unit, magnifying the synthesized light signal, and imaging the magnified light signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
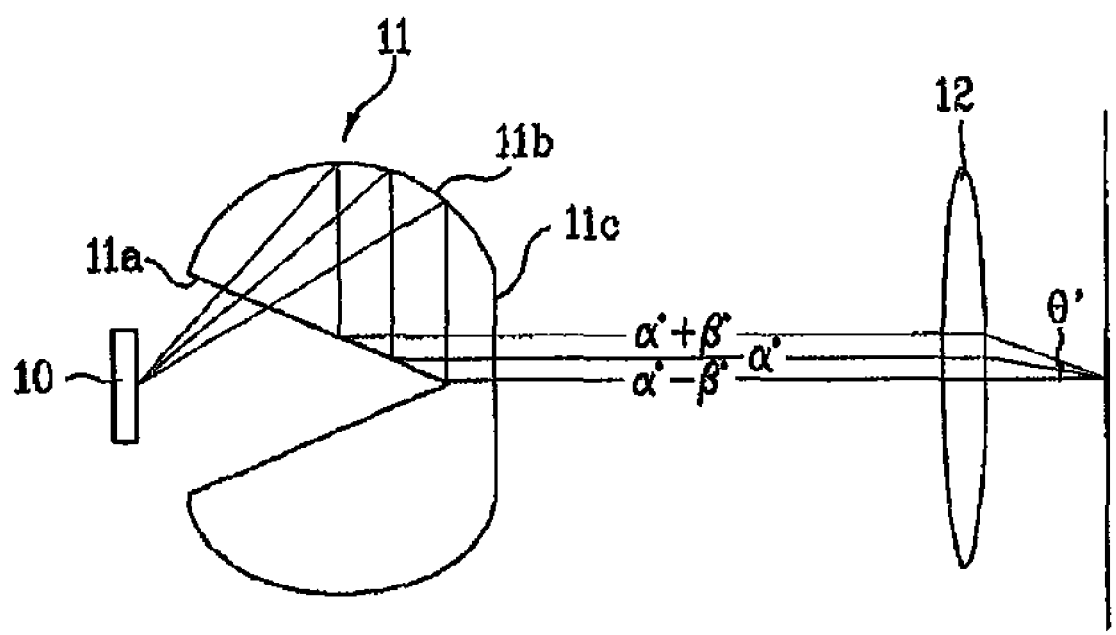
FIG. 1 is a conceptual diagram illustrating an illumination device according to a first preferred embodiment of the present invention.

FIG. 1 is a conceptual diagram illustrating an illumination device according to a first preferred embodiment of the present invention.

Referring to FIG. 1, the illumination device according to a first preferred embodiment of the present invention includes a light source 10 for generating a light signal; a switch 11 for reconstructing a usage angle of the light signal generated from the light source 10, and generating the reconstructed light signal; and an illumination lens 12 for focusing the light signal generated from the switch 11, and generating the focused light signal.

The light source 10 may include a plurality of light sources such as lamps or LEDs.

The switch 11 is located between the light source 10 and the illumination lens 12, and reconstructs the usage angle of the light signal applied to the illumination lens 12 at any one of angles 30°~60°.

If a light source 10 based on the Lambertian divergence scheme is indicative of the LED, the switch 11 reconstructs the usage angle of the light signal at an angle of ±45°, such that the reconstructed light signal is incident upon the illumination lens 12.

The switch 11 has an outer surface configured in the form of a spherical- or aspheric structure, and an inner surface thereof is opened at a predetermined angle on the basis of an optic axis. As a result, the switch 11 reconstructs the usage angle of the light signal via at least two reflections, such that the luminous flux is maximally distributed at the reconstructed usage angle.

The switch 11 is made of a transparent material capable of reflecting the light signal at a high refraction rate. For example, the switch 11 is made of glass or PMMA (Poly Methylmethacrylate). In the case of fabricating the switch 11, the above-mentioned material is melted, and the switch 11 having a thickness of 10~40 mm is manufactured by a frame or mold.

The switch 11 includes: a first surface 11a via which a low-refraction light signal from among the light signal generated from the light source 10 is transmitted, and a high-refraction light signal is reflected; a second surface 11b having a curvature at which the light signal transmitted from the first surface 11a is reflected; and a third surface 11c via which the high-refraction light signal reflected from the first surface 11a is transmitted such that the resultant high-refraction light signal is applied to an illumination lens 12.

The first surface 11a is indicative of a first transmission surface 11a arranged at a specific surface on which the light signal generated from the light source 10 is incident.

The second surface 11b is coated with a reflective layer, is arranged on a specific surface facing the first transmission surface 11a, and reflects the light signal transmitted from the first transmission surface 11a.

The first surface 11a re-reflects the high-refraction light signal reflected from the second surface 11b.

The third surface 11c serves as a transmission surface, enables the light signal reflected from the first surface 11a to be transmitted, and outputs the resultant light signal to the illumination lens 12.

In operations, it is noted that the usage angle of the light signal is defined as $\alpha=\pm 45°$, and an angle allowed by an Etendue is defined as $\beta=\pm 15°$.

The usage angle of the light signal from the light source 10 to the switch 11 is in the range from 0° to 90° on the basis of an optic axis. The usage angle of the light signal incident upon the first transmission surface 11a is in the range from 0° to 45° on the basis of the optic axis.

As can be seen from FIG. 1, the light signal is reflected from the switch 11 two times, such that the resultant light signal having a user-desired output angle is focused on the basis of the optic axis of the illumination lens 12. In this way, only the light signal in which a luminous flux indicating the user-desired usage angle is maximally distributed is selectively used, and the light signal is illuminated on the projection device (not shown) via the illumination lens unit 12, such that the image is projected.

The switch 11 may reconstruct the usage angle of the light signal via at least two reflections of the light signal. And, the usage angle may be set to a specific angle at which the shape of the switch 11 is formed, and the output angle of the light signal may be reconstructed as the specific angle.

For example, the angle at which the first transmission surface 11a and the second reflection surface 11c are formed, and the angle of the second reflection surface 11c are adjusted, such that the usage angle of the output light signal can be adjusted.

According to the above-mentioned first preferred embodiment of the present invention, an angle between two first transmission surfaces 11a is set to 45°.

Figure 2:
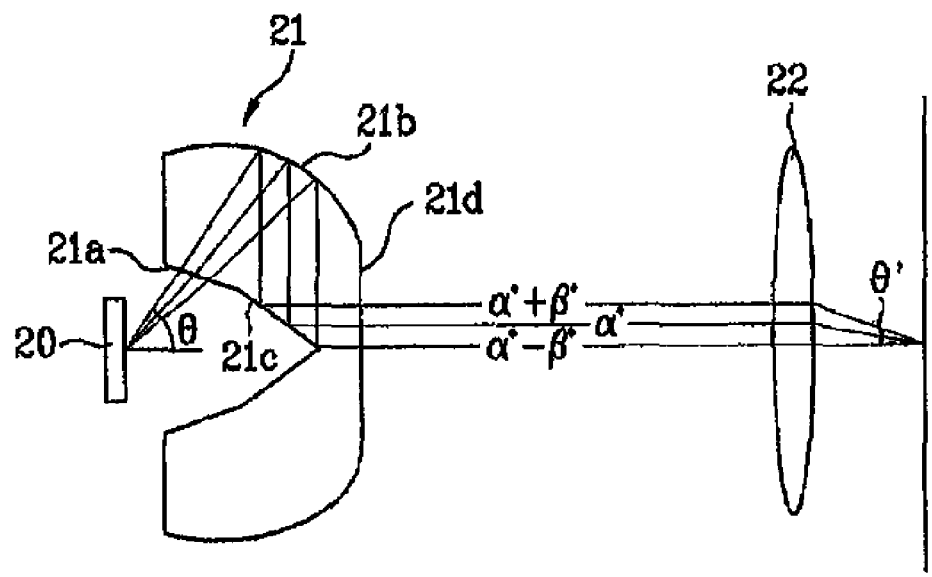
FIG. 2 is a conceptual diagram illustrating an illumination device according to a second preferred embodiment of the present invention.

FIG. 2 is a conceptual diagram illustrating an illumination device according to a second preferred embodiment of the present invention.

Referring to FIG. 2, similar to the illumination device of FIG. 1, the illumination device according to the second preferred embodiment of the present invention includes a light source 20, a switch 21, and an illumination lens 22. Therefore, the same components as those of FIG. 1 will herein be omitted for the convenience of description.

The switch 21 includes: a first transmission surface 21a via which a low-refraction light signal from among the light signal generated from the light source 20 is transmitted; a first reflection surface 21b having a curvature at which the light signal transmitted from the first transmission surface 21a is reflected; a second reflection surface 21c via which the light signal reflected from the first reflection surface 21b is re-reflected; and a second transmission surface 21d via which the light signal reflected from the second reflection surface 21c is transmitted such that the resultant light signal is applied to the illumination lens 22.

In more detail, the switch 21 includes: a first transmission surface 21a arranged on an incident surface of the light signal generated from the light source 20; a first reflection surface 21b arranged to face the first transmission surface 21a, such that it reflects the light signal transmitted from the first transmission surface 21a; a second reflection surface 21c arranged to face the first reflection surface 21a, such that it reflects the light signal reflected from the first reflection surface 21b; and a second transmission surface 21d arranged to face the second reflection surface 21c, for enabling the light signal reflected from the first reflection surface 21a to be transmitted, and applying the resultant light signal to the illumination lens 22.

In operations, it is noted that the usage angle of the light signal is defined as $\alpha = \pm 45°$, and an angle allowed by an Etendue is defined as $\beta = \pm 15°$.

The usage angle of the light signal from the light source 20 to the switch 21 is in the range from 0° to 90° on the basis of an optic axis. The usage angle of the light signal incident upon the first transmission surface 21a is in the range from 0° to 45° on the basis of the optic axis.

As can be seen from FIG. 2, the light signal is reflected from the switch 21 two times, such that the resultant light signal having a user-desired output angle is focused on the basis of the optic axis of the illumination lens 22. In this way, only the light signal in which a luminous flux indicating the user-desired usage angle is maximally distributed is selectively used, and the light signal is illuminated on the projection device (not shown) via the illumination lens unit 22, such that the image is projected.

The switch 21 may reconstruct the usage angle of the light signal via at least two reflections of the light signal. Also, the output angle may be set to a specific angle at which the shape of the switch 21 is formed, such that the output angle of the light signal may be reconstructed as the specific angle.

For example, the angle at which the first transmission surface 21a and the second reflection surface 21c are formed, and the angle of the second reflection surface 21c are adjusted, such that the usage angle of the output light signal can be adjusted.

According to the above-mentioned second preferred embodiment of the present invention, the angle of the second reflection surface 21c is set to 45°, and an angle at which the first transmission surface 21a and the second reflection surface 21c are formed is set to 5°.

Figure 3:
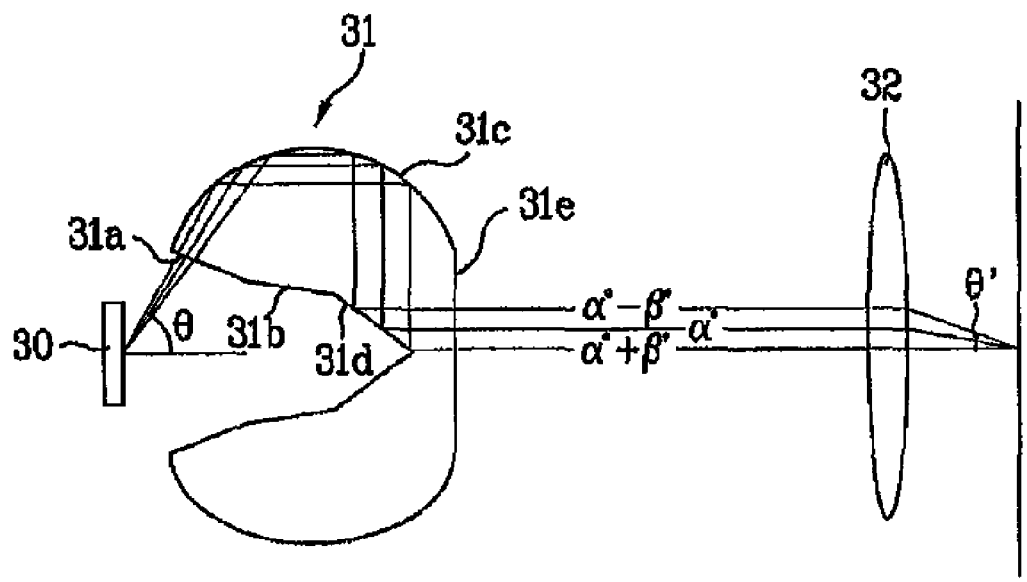
FIG. 3 is a conceptual diagram illustrating an illumination device according to a third preferred embodiment of the present invention.

FIG. 3 is a conceptual diagram illustrating an illumination device according to a third preferred embodiment of the present invention.

Referring to FIG. 3, similar to the illumination device of FIG. 1, the illumination device according to the third preferred embodiment of the present invention includes a light source 30, a switch 31, and an illumination lens 32, such that the same components as those of FIG. 1 will herein be omitted for the convenience of description.

The switch 31 includes: a first transmission surface 31a via which a low-refraction light signal from among the light signal generated from the light source 30 is transmitted; a first transmission surface 31b via which the light signal transmitted from the light source 30 is reflected; a second reflection surface 31c having a curvature at which the light signal transmitted from the first transmission surface 31a is reflected; a third reflection surface 31d via which the high-refraction light signal reflected from the second reflection surface 31c is re-reflected; and a second transmission surface 31e via which the light signal reflected from the third reflection surface 21d is transmitted such that the resultant light signal is applied to the illumination lens 32.

In more detail, the switch 31 includes: a first transmission surface 31a arranged on a specific surface on which the light signal transmitted from the light source 30 is incident in a straight line; a second reflection surface 31c arranged to face the first transmission surface 31a such that it reflects the light signal transmitted from the first transmission surface 31a; a first reflection surface 31b arranged on any one of surfaces facing the second reflection surface 31c, such that it reflects the light signal generated from the light source 30; a third reflection surface 31d arranged on any one of surfaces facing the second reflection surface 31c, such that it reflects the light signal reflected from the second reflection surface 31c; and a second transmission surface 31e arranged on any one of surfaces facing the third reflection surface 31d, for enabling the light signal reflected from the third reflection surface 31d to be transmitted, and applying the resultant light signal to the illumination lens 32.

In operations, it is noted that an optic-axis reference angle of the light signal is defined as $\alpha = \pm 45°$, and an optic-axis allowable angle allowed by an Etendue is defined as $\beta = \pm 15°$.

The optic-axis reference angle of the light signal from the light source 30 to the switch 31 is in the range from 0° to 90° on the basis of an optic axis. The optic-axis reference angle of the light signal incident upon the first transmission surface 31a is in the range from 0° to 45°.

As can be seen from FIG. 3, the light signal is reflected from the switch 31 three times, such that the resultant light signal having a user-desired optic-axis reference angle of ±45° is focused on the illumination lens 22.

In this way, only the light signal in which a luminous flux is maximally distributed is selectively used, and the light signal is illuminated on the projection device (not shown) via the illumination lens unit 32, such that the image is projected.

The switch 31 may reconstruct the optic-axis reference angle of the light signal via at least three reflections of the light signal.

The optic-axis reference angle is indicative of a specific angle at which the shape of the switch 31 is formed, such that the optic-axis reference angle of the light signal may be reconstructed as the specific angle.

For example, a first angle between the first transmission surface 31a and the first reflection surface 31b, a second angle between the first transmission surface 31a and the second reflection surface 31c, a third angle between the second reflection surface 31c and the second transmission surface 31e, and a fourth angle between the first reflection surface 31b and the third reflection surface 31d are adjusted such that the optic-axis reference angle of the light signal can also be adjusted.

According to the above-mentioned third preferred embodiment of the present invention, the angle between the first transmission surface 31a and the first reflection surface 31b is set to 7°, the angle between the first transmission surface 31a and the second reflection surface 31c is set to 30°, the angle between the second transmission surface 31c and the second transmission surface 31e is set to 25°, and the angle between the first reflection surface 31b and the third reflection surface 31d is set to 3°.

Each of the above-mentioned switches 11, 21, and 31 may include an optical fiber (not shown). Each of the switches includes surfaces that are symmetrical about the optic axis. These surfaces are referred to as rotation symmetric surface with respect to the optic axis of light generated from the light source. As shown FIG. 1, two transmission surfaces (11a and 11c) or one reflection surface (11b) is a rotational symmetric surface with respect to an optic axis of light generated from the light source (10). Here, the optic axis of light generated from the light source (10) goes through a central axis of a switch (11). The central axis of the switch (11) is at right angles to the transmission surface (11c). As shown FIG. 2, two transmission surfaces (21a and 21d) or two reflection surfaces (21b and 21c) are rotational symmetric surfaces with respect to an optic axis of light generated from the light source (20). Here, the optic axis of light generated from the light source (20) goes through a central axis of a switch (21). The central axis of the switch (21) is at right angles to the transmission surface (21d). As shown FIG. 3, two transmission surfaces (31a and 31e) or three reflection surfaces (31b, 31c and 31d) are rotational symmetric surfaces with respect to an optic axis of light generated from the light source (30). Here, the optic axis of light generated from the light source (30) goes through a central axis of a switch (31). The central axis of the switch (31) is at right angles to the transmission surface (31e).

The output angle of the light signal generated from the light source 10, 20, and 30 is in the range from 0° to 90°, and the usage angle of the incident light signal is in the range from 0 to 45°. Under this condition, the illumination device enables the light signal to pass through the optical fiber, such that the usage angle or optic-axis reference angle of the light signal ranging from the optical fiber to the illumination lens may be reconstructed at an angle of ±45°.

FIG. 4 shows a pupil map and a luminous-flux distribution according to the present invention.

Figure 4A:
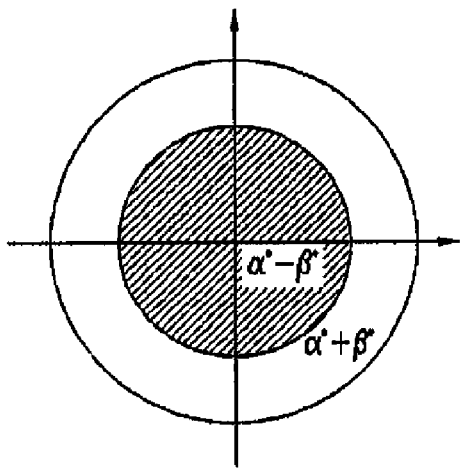
FIG. 4 shows a pupil map and a luminous-flux distribution according to the present invention.
Figure 4B:
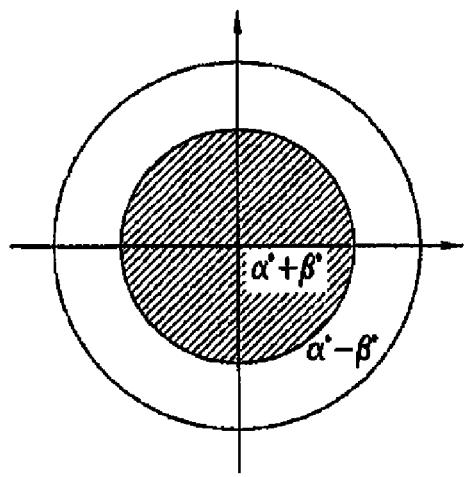
Figure 4C:
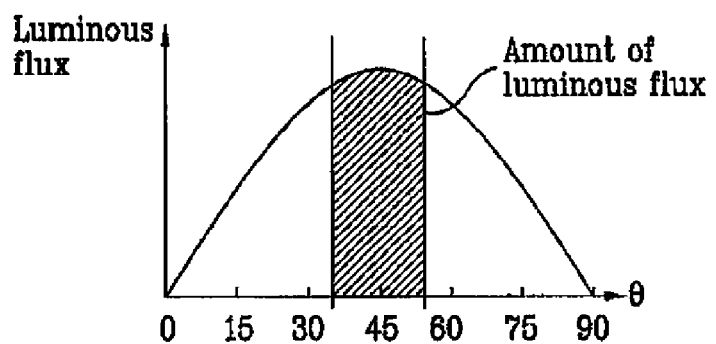

FIG. 4A shows a pupil map according to first to second preferred embodiments of the present invention. FIG. 4B shows a pupil map according to a third preferred embodiment of the present invention. FIG. 4C is a graph illustrating a luminous flux according to first to third preferred embodiments of the present invention.

If an amount of Etendue of the projection system is determined, a user-desired angle at a central point of the Etendue range must be set to a central angle.

For example, provided that the central angle is set to α°, an Etendue-allowed angle is set to β°, and the pupil maps shown in the above-mentioned first to third preferred embodiments of the present invention are applied to the above-mentioned angles, the illumination lens receives the light signal in which the luminous flux is maximally distributed, such that the projection system including the above-mentioned illumination lens may have the highest efficiency.

As can be seen from FIG. 4A, α°−β° may be set to the central point of the pupil map, and α°+β° may be set to the maximum angle allowed by Etendue.

As can be seen from FIG. 4B, α°+β° may be set to the central point of the pupil map, and α°−β° may be set to the maximum angle allowed by Etendue. Other unused angles are arranged outside of the Etendue-allowed area.

If the luminous flux is used as described above, the distributed graph is shown in FIG. 4C, such that the illumination device according to the present invention can acquire the maximum light efficiency. As a result, the projection including the illumination device can also acquire the maximum light efficiency.

A conventional art associated with the present invention will hereinafter be described with reference to FIGS. 5~9.

Figure 5:
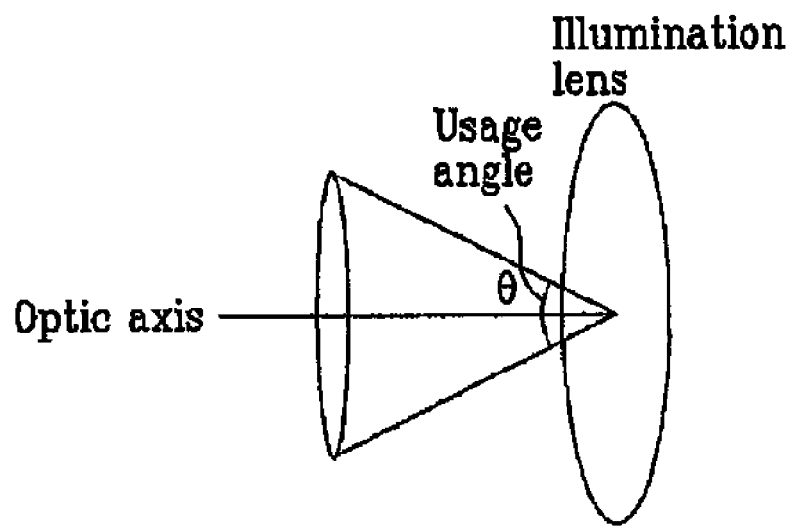
FIG. 5 is a usage angle of a light signal for use in a general illumination device.

FIG. 5 is a usage angle of a light signal for use in a general illumination device.

Referring to FIG. 5, the illumination device selects only a predetermined angle from among 0° to other degrees on the basis of the optic axis of the illumination lens, and uses the selected angle.

In this case, if the light-amount distribution of the illumination device is set to 0°, the conventional illumination device can acquire the maximum efficiency. However, a light amount of a general light source, i.e., the maximum distribution of the luminous flux, has a maximum light-amount value at an angle of ±45°, instead of the above angle of 0°.

For example, although a general illumination device for using the lamp as a light source determines its own maximum light-amount value according to reflection-surface shapes, it should be noted that the maximum light-amount value is actually distributed at the angle of 30° on the basis of the optic axis.

Most general illumination devices follow the Lambertian divergence scheme. In this way, if the general illumination devices follow the Lambertian divergence scheme, the maximum light-amount value is distributed at the angle of 45° on the basis of the optic axis.

Figure 6:
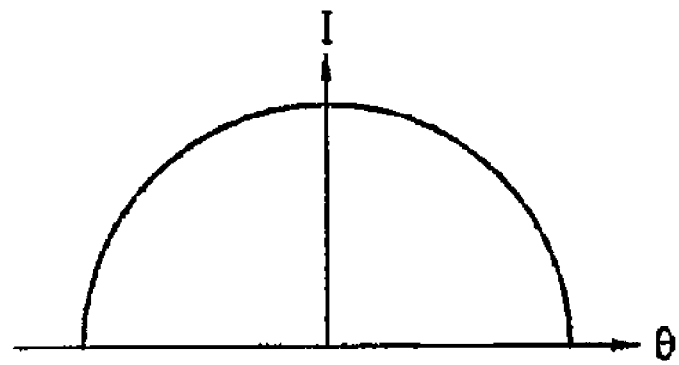
FIG. 6 shows a luminous-intensity distribution of a Lambertian source according to the present invention.

The luminous-intensity distribution of the Lambertian source can be represented by the following Equation 1, and the graph illustrating the luminous-intensity distribution is shown in FIG. 6:

$$I = I_0 \cos \theta \quad \text{[Equation 1]}$$

The light signal incident upon the Lambertian source's solid angle dθcell can be represented by the following Equation 2:

$$\frac{dL}{d\theta} \propto I_0 \cos\theta \sin\theta \quad \text{[Equation 2]}$$

Figure 7A:
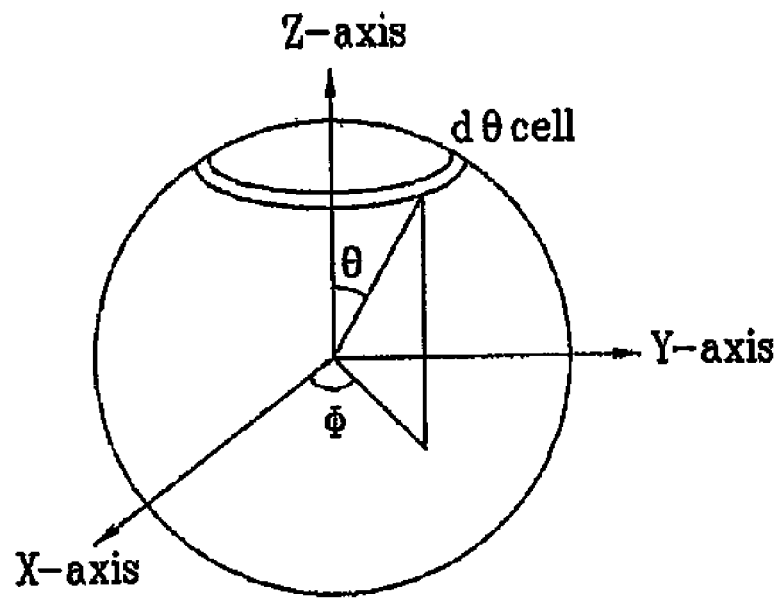
FIG. 7 shows a definition of a solid angle dθcell of a Lambertian source and a distribution of a luminous flux incident upon the solid angle dθcell according to the present invention.

The resultant value of Equation 2 can be represented by the graph of FIG. 7A.

Figure 7B:
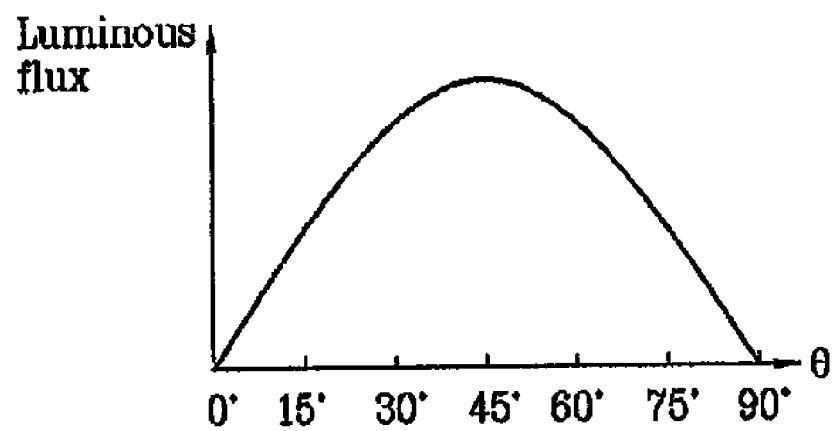

FIG. 7B shows a graph illustrating the luminous flux incident upon the solid angle dθcell. As can be seen from FIG. 7B, it can be recognized that the largest amount of luminous flux is maximally distributed in the vicinity of the angle of 45°.

Therefore, it can be recognized that the above-mentioned illumination device capable of using a predetermined angle θ' on the basis of the angle of 45° has a luminous flux higher than that of the conventional illumination device capable of using a predetermined angle θ' on the basis of the angle of 0°.

Figure 8A:
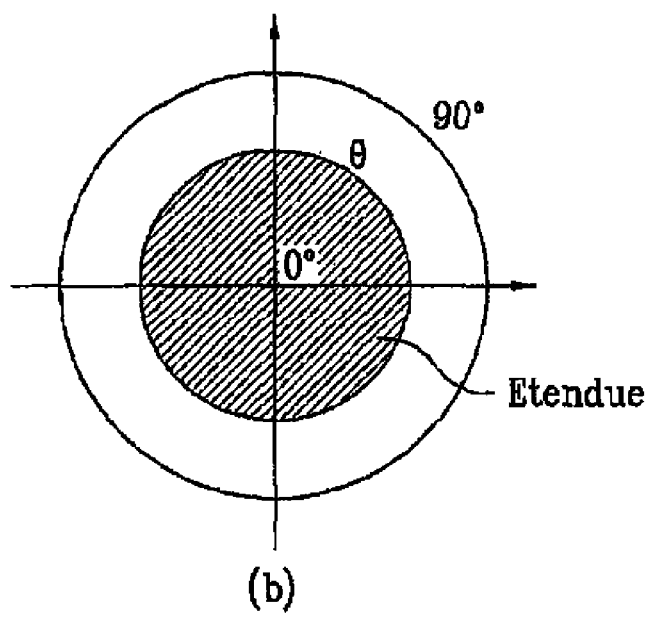
FIG. 8 shows a pupil map for use in a general illumination device.

FIG. 8A shows a pupil map for use in a general illumination device. In more detail, FIG. 8A shows a pupil map in which the angle of the light signal generated from the light source is arranged at a specific position. The iris diaphragm (i.e., stop) of the illumination device corresponds to the above-mentioned specific position.

As shown in FIG. 8A, 0° is located at the center part of the pupil map, and 90° is located at the outermost part of the pupil map. A plurality of concentric circles may be drawn at individual angles.

In this case, the circle may be cut by a predetermined area according to Etendue of the illumination device, and is then used as necessary.

The Etendue of the illumination device is fixed, such that the illumination device can employ the light signal in the range from 0° to a predetermined angle based on the Etendue in the light signal generated from the light source.

Figure 8B:
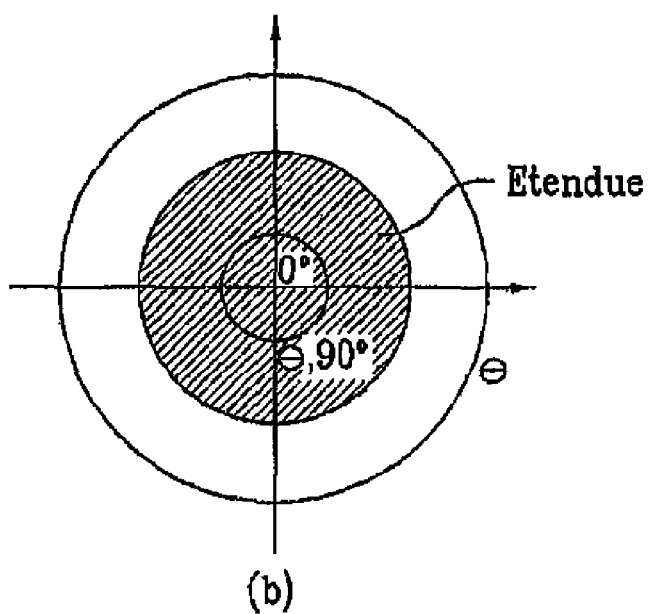

FIG. 8B shows a pupil map of a general illumination device. In FIG. 5B, the illumination lens focuses the light signal in the range from 0° to a predetermined angle, and is unable to focus the light signal at the remaining angles other than the above-mentioned range from 0° to the predetermined angle.

Referring to FIG. 5B, according to the general illumination device, the light signal having an output angle 90° on the basis of the light source is next to the other light signal having an output angle θ° on the basis of the light source, such that the light signal having the output angle 90° occupies a corresponding position in the pupil map. The light signal having an angle larger than the angle θ° occupies the last position in the pupil map.

Therefore, the resultant light signal to be used has the angle of FIG. 8B. According to the method of FIG. 8B, the illumination device uses other angles other than the maximum angle.

Provided that the Lambertian source is applied to the example of FIG. 5B, the maximum distribution graph of the luminous flux has a symmetrical structure on the basis of the angle 45°, such that maximum light efficiency can be acquired on the condition that the luminous flux distributed at the angle of ±45° is used.

Figure 9A:
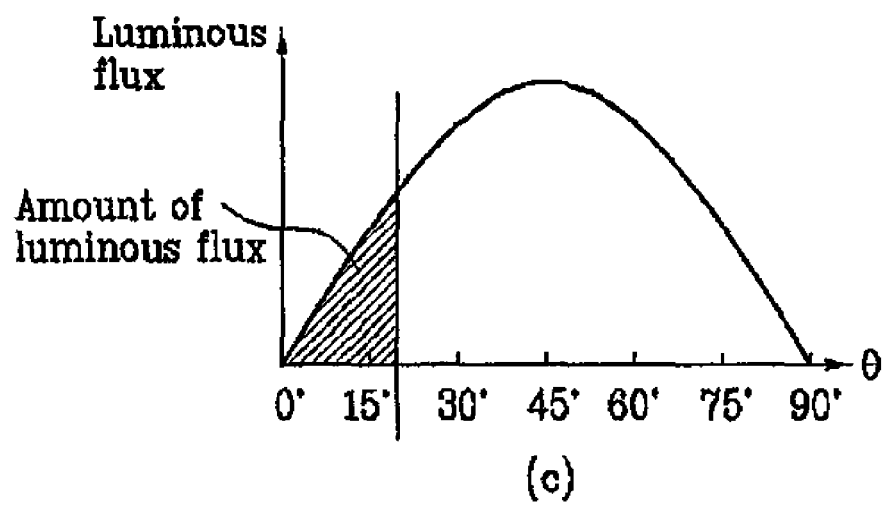
FIG. 9 shows a luminous flux distributed at an output angle θ selected on the pupil map of FIG. 6 according to the present invention.
Figure 9B:
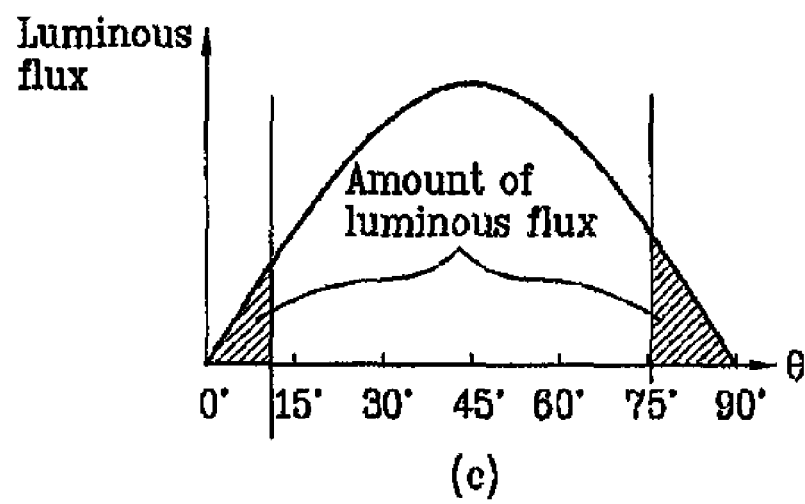

FIG. 9A is a graph illustrating a luminous flux distributed at an output angle of θ arbitrarily selected on the pupil map. The hatched area of FIG. 9A indicates an amount of luminous flux.

As described above, the general illumination device does not use the light signal in which the luminous flux is maximally distributed.

Therefore, in order to acquire a maximum light amount from the illumination device, not only the pupil map in which the luminous flux incident upon the illumination lens is maximally distributed, but also the graph must be equal to those of FIG. 4.

A projection display system using the above-mentioned illumination device will hereinafter be described with reference to the annexed drawings.

Figure 10:
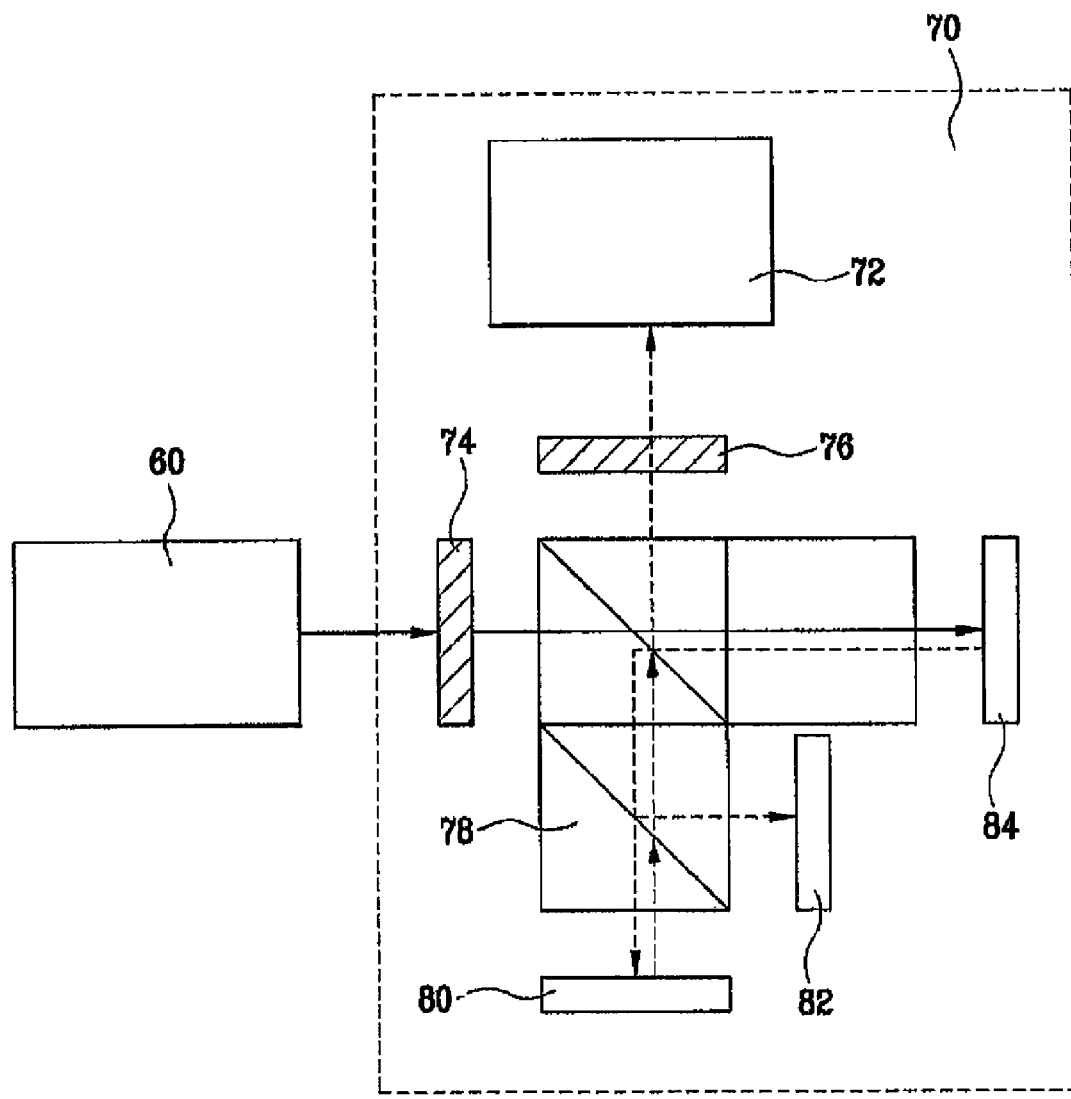
FIG. 10 is a block diagram illustrating a projection display system including an illumination device according to a fourth preferred embodiment of the present invention.

FIG. 10 is a block diagram illustrating a projection display system including an illumination device according to a fourth preferred embodiment of the present invention.

Referring to FIG. 10, the projection display system includes an illumination system 60 and a projection system 70.

The projection system 70 includes a projection lens 72, a plurality of color-selection polarization plates 74~76, a dichroic filter 78, and a plurality of LCD panels 80, 82, and 84.

The illumination system includes the above-mentioned illumination device according to the present invention, serves as a light source of the projection display system, and applies the light signal to the projection system 709.

Figure 11:
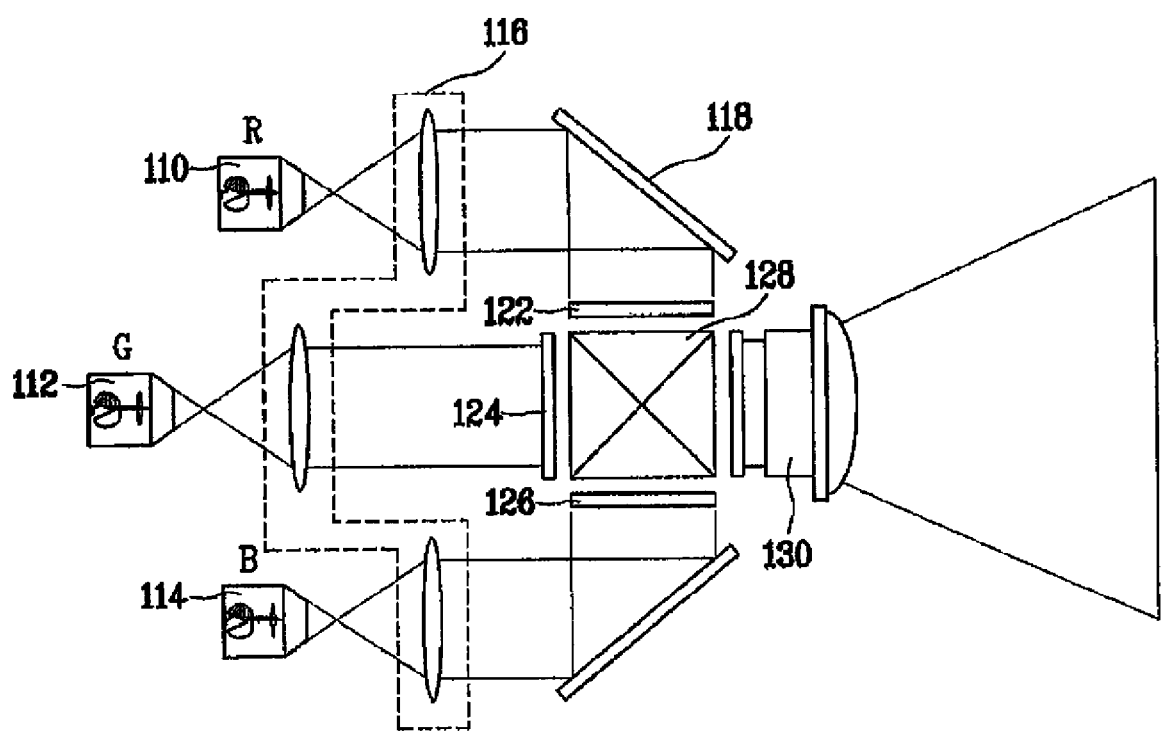
FIG. 11 is a block diagram illustrating a transmission-type 3-chip projection display system including an illumination device according to a fifth preferred embodiment of the present invention.

FIG. 11 is a block diagram illustrating a transmission-type 3-chip projection display system including an illumination device according to a fifth preferred embodiment of the present invention.

Referring to FIG. 11, the transmission-type 3-chip projection display system includes a plurality of illumination devices 110, 112, and 114, an illumination lens system 116, a plurality of LCD panels 122, 124, and 126, a plurality of reflective mirrors 118 and 120, a synthesizer 128, and a projection lens system 130.

In this case, the constituent components 116~130 other than the illumination devices 110, 112, and 114 have the same functions as those of the projection system 70 shown in FIG. 8.

Referring to FIG. 11, the illumination devices 110, 112, and 114 uniformly generate a red (R) light signal, a green (G) light signal, and a blue (B) light signal, respectively. The R, G, and B light signals pass through the illumination lens system 116 and the reflective mirrors 118~120, and are then applied to the synthesizer 128 via the LCD panels 122, 124, and 126.

In this case, the synthesizer 128 indicating an X-shape prism synthesizes the light signals received via the LCD panels 122, 124, and 126. The projection lens system 130 magnifies the resultant light signals synthesized by the synthesizer 128, and forms an image on the screen.

Figure 12:
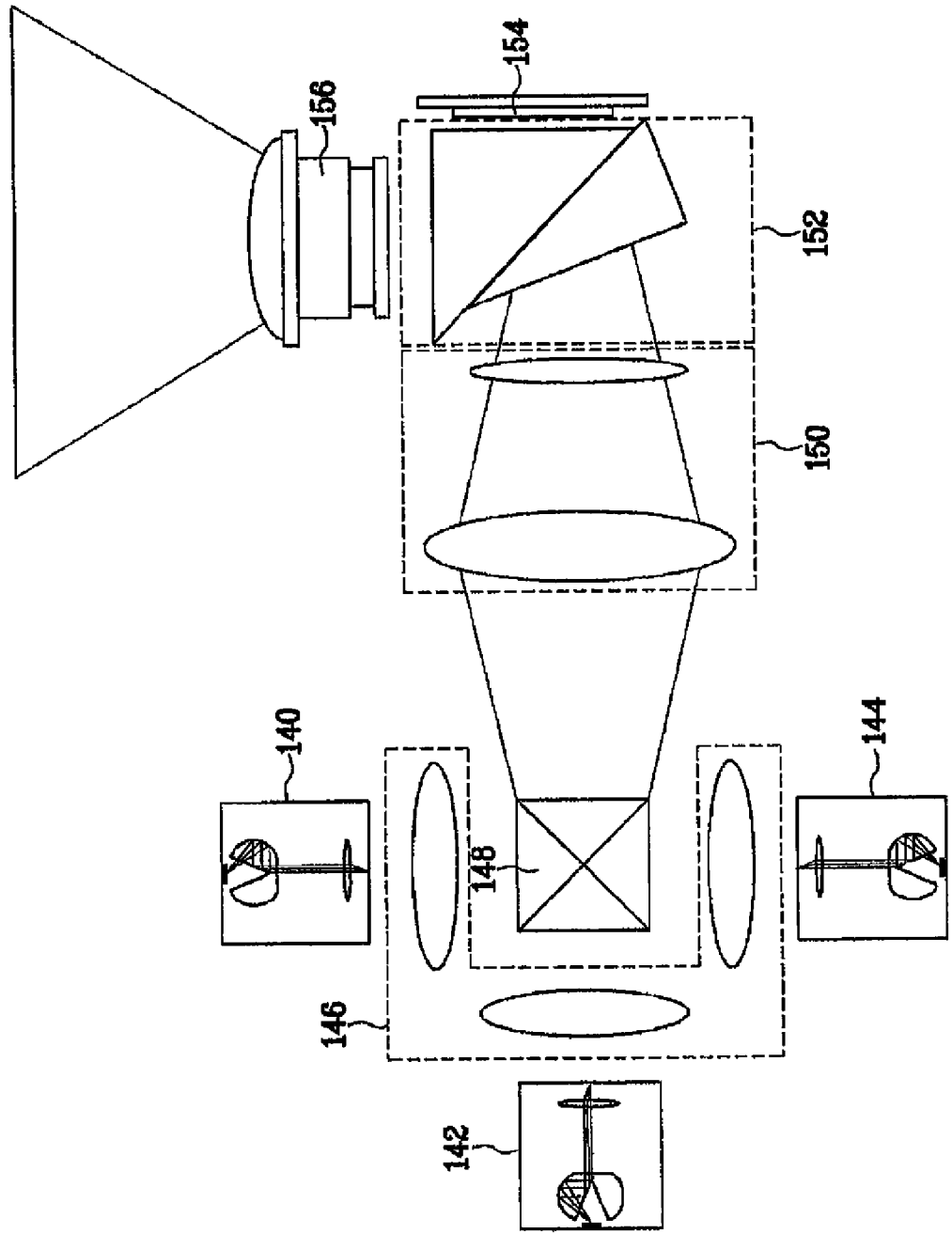
FIG. 12 is a block diagram illustrating a 1-chip DLP (Digital Lighting Processing) projection display system including an illumination device according to a sixth preferred embodiment of the present invention.

FIG. 12 is a block diagram illustrating a 1-chip DLP (Digital Lighting Processing) projection display system including an illumination device according to a sixth preferred embodiment of the present invention.

Referring to FIG. 12, the 1-chip DLP (Digital Lighting Processing) projection display system includes a plurality of illumination devices 140, 142, and 144, a plurality of illumination lens systems 146 and 150, a synthesizer 148, a TIR (Total Internal Reflection) prism 152, an LCD panel 154, and a projection lens system 156.

In this case, the constituent components other than the illumination devices 140, 142, and 144 have the same functions as those of the projection system 70 shown in FIG. 8.

Referring to FIG. 12, the illumination devices 140, 142, and 144 generate a red (R) light signal, a green (G) light signal, and a blue (B) light signal, respectively. The R, G, and B light signals are illuminated on the illumination lens system 146.

In this case, the synthesizer 148 receives the light signals from the illumination devices 140, 142, and 144 via the illumination lens system 146, and synthesizes the received light signals. The synthesized result is applied to the projection lens system 156 via the TIR prism 152 and the LCD panel 154, such that the projection lens system 156 magnifies the resultant light signals, and forms an image on the screen.

Figure 13:
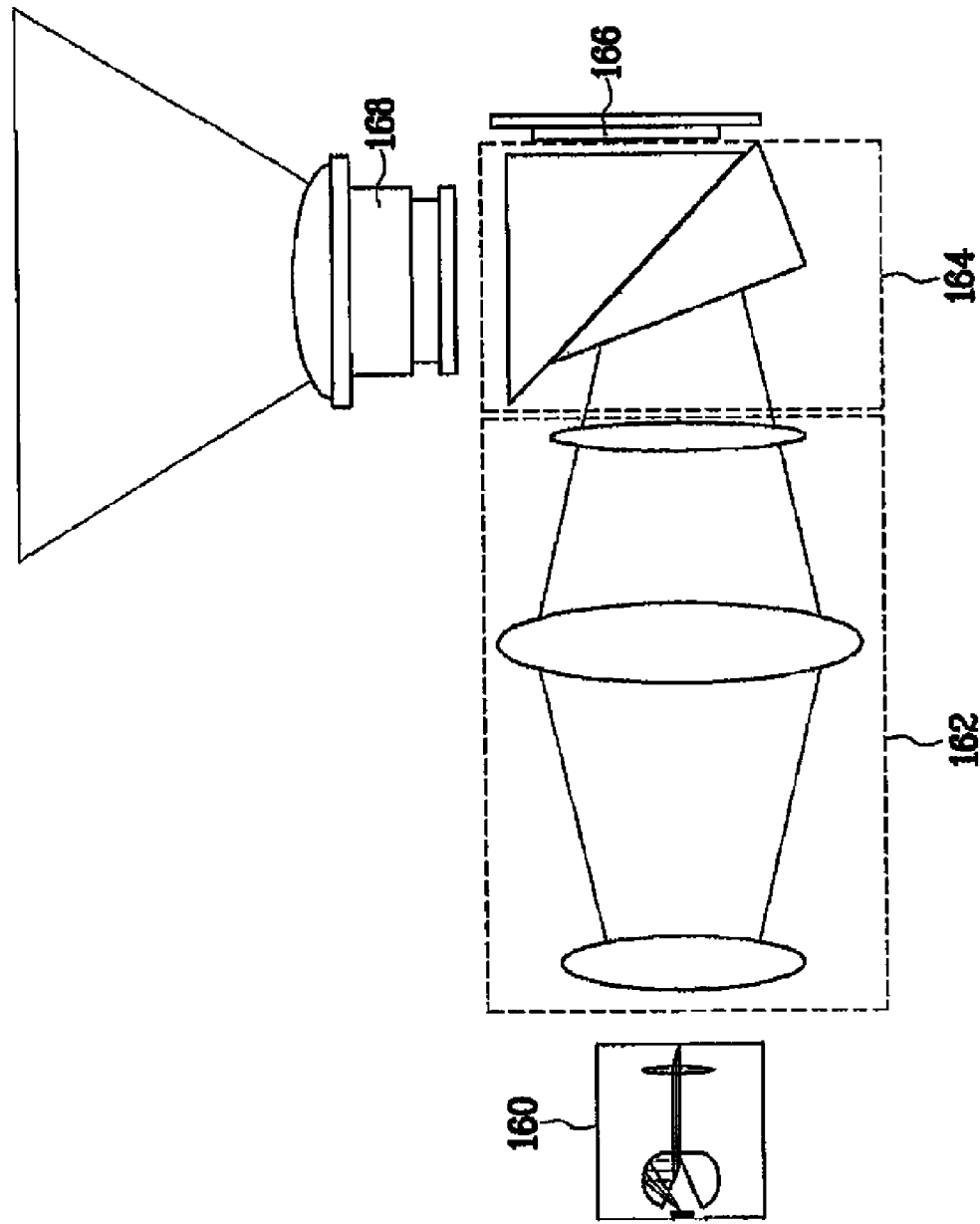
FIG. 13 is a block diagram illustrating a projection display system including an illumination device according to a seventh preferred embodiment of the present invention.

FIG. 13 is a block diagram illustrating a projection display system including an illumination device according to a seventh preferred embodiment of the present invention.

Referring to FIG. 13, the projection display system according to the seventh preferred embodiment of the present invention includes an illumination device 160, an illumination lens system 162, a TIR system 164, an LCD panel 166, and a projection lens system 168.

The illumination device 160 shown in FIG. 13 includes a plurality of light sources capable of generating different-colored light signals.

For example, the illumination device 160 may include LEDs for generating RGB light signals. In this case, there is no need to use the synthesizer 128 or 148 of FIG. 10 or 11.

The illumination lens system 162, the TIR prism 164, the LCD panel 166, and the projection lens system 168 shown in FIG. 13 have the same functions as the illumination lens system 150, the TIR prism 152, the LCD panel 154, and the projection lens system 156 shown in FIG. 10, such that a detailed description thereof will herein be omitted for the convenience of description.

The projection display system shown in FIG. 13 controls a plurality of LED light sources, forms images of individual colors, synthesizes the formed images into a single image, and forms the synthesized images on the screen via the projection lens system 168.

As apparent from the above description, the present invention provides an illumination device capable of generating a light signal in which a luminous flux is maximally distributed, such that it provides a small-sized projection system having high-quality video data.

The illumination device employs light signal in which a luminous flux is maximally distributed, and the projection system includes the illumination device therein.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A projection display system comprising:
a light source for generating a light signal;
a switch for reconstructing a usage angle of the light signal generated from the light source, and generating the reconstructed light signal; and
an illumination lens unit for focusing the light signal generated from the switch,
wherein the switch has at least two transmission surfaces and at least one reflection surface,
wherein at least one of the transmission surfaces or the reflection surface is a rotation symmetric surface with respect to an optic axis of light generated from the light source, and
wherein the switch is a single body having an outer surface configured in the form of a spherical structure or aspheric structure, and an inner surface opened at a predetermined angle on the basis of an optic axis.

2. The projection display system according to claim 1, wherein the switch reconstructs the light signal at between the angles of 30 degrees and 60 degrees.

3. The projection display system according to claim 1, wherein the switch includes:
a first surface via which a low-refraction light signal from among the light signal generated from the light source is transmitted, and a high-refraction light signal is reflected;
a second surface having a curvature at which the light signal transmitted from the first surface is reflected; and
a third surface via which the high-refraction light signal reflected from the first surface is transmitted.

4. The projection display system according to claim 1, wherein the switch includes:
a first transmission surface via which a low-refraction light signal from among the light signal generated from the light source is transmitted;
a first reflection surface via which the light signal transmitted from the first transmission surface is reflected;
a second reflection surface via which the light signal reflected from the first reflection surface is reflected; and
a second transmission surface via which the light signal reflected from the second reflection surface is transmitted.

5. The projection display system according to claim 1, wherein the switch includes:
a first transmission surface via which a low-refraction light signal from among the light signal generated from the light source is transmitted;
a first reflection surface via which the light signal transmitted from the light source is reflected;
a second reflection surface via which the light signal transmitted from the first transmission surface is reflected;
a third reflection surface via which the light signal reflected from the second reflection surface is reflected; and
a second transmission surface via which the light signal reflected from the third reflection surface is transmitted.

6. The projection display system according to claim 1, wherein the switch reconstructs an output angle of the light signal via two or more reflections of the light signal.

7. The projection display system according to claim 1, wherein the switch further includes an optical fiber.

8. The projection display system according to claim 1, wherein the light source is comprised of any one of a lamp and a light emitting diode (LED).

9. The projection display system according to claim 1, wherein the switch is located between the light source and the illumination lens unit.

10. A projection display system comprising:
a light source for generating a light signal;
a switch for reconstructing a reference angle of an optic axis of the light signal generated from the light source, and generating the reconstructed light signal; and
an illumination lens unit for receiving the light signal having the reconstructed optic-axis reference angle from the switch, and focusing the received light signal,
wherein the switch has at least two transmission surfaces and at least one reflection surface,
wherein at least one of the transmission surfaces or the reflection surface is a rotation symmetric surface with respect to an optic axis of light generated from the light source, and
wherein the switch is a single body having an outer surface configured in the form of a spherical structure or aspheric structure, and an inner surface opened at a predetermined angle on the basis of an optic axis.

11. The projection display system according to claim 10, wherein the switch reconstructs the optic-axis reference angle of the light signal between the angles of 30 degrees and 60 degrees.

12. The projection display system according to claim 10, wherein the switch reconstructs the optic-axis reference angle of the light signal via two or more reflections of the light signal.

13. The projection display system according to claim 1, further comprising:
a projection unit for synthesizing the light signal generated from the light source, magnifying the synthesized light signal, and imaging the magnified light signal.

14. The projection display system according to claim 13, wherein the projection unit is configured in the form of a transmission-type 3-chip structure or a 1-chip DLP (Digital Lighting Processing) structure.

* * * * *